Sept. 1, 1931.  G. D. JONES  1,821,644
FLEXIBLE CONVEYER
Filed Jan. 20, 1928   7 Sheets-Sheet 3

Gwilym D. Jones, INVENTOR
BY Victor J. Evans
ATTORNEY

Sept. 1, 1931.  G. D. JONES  1,821,644
FLEXIBLE CONVEYER
Filed Jan. 20, 1928   7 Sheets-Sheet 5

Gwilym D. Jones, INVENTOR.
BY Victor J. Evans
ATTORNEY

Patented Sept. 1, 1931

1,821,644

UNITED STATES PATENT OFFICE

GWILYM D. JONES, OF OAK CREEK, COLORADO, ASSIGNOR OF ONE-HALF TO BENJAMIN W. SNODGRASS, OF DENVER, COLORADO

FLEXIBLE CONVEYER

Application filed January 20, 1928. Serial No. 248,195.

My present invention has reference to a material conveyer designed primarily for use in coal mines but also susceptible for use in other connections where material is to be conveyed.

The primary object of the invention is the provision of a flexible conveyer that is cable driven in a manner to impart a simultaneous rapid or violent jerking movement to the conveyer in one direction to cause the material thereon to be bodily moved thereover in an outward direction and to likewise impart a comparatively slow jerking movement to the conveyer to return the same to starting position.

A further object is the provision of a conveyer for this purpose in which the flights constituting the said conveyer may be arranged at desired angles with respect to each other, so that the receiving end of the conveyer may be conveniently arranged for the reception of material, and in which simple but novel means is provided for associating the flights of the conveyer and also in which means is provided for imparting a continuous but intermittent motion to the conveyers, such motion being rapid and violent when the conveyers are moved in delivery direction to impart a shoving or pushing action to the material therein, and being slow and steady in the return of the conveyers to their initial positions to prevent the material from sliding or moving backwards thereon.

A still further object is the provision of a material conveyer that is made up of flights to provide a main conveyer, all of such conveyers being cable driven, while a single operating means is provided for actuating all of the conveyers.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claims.

In the showing of the drawings, I have illustrated my improvement in connection with a coal mine, the main passage of which is indicated by the numeral 1, the rooms which communicate with the passage by the numerals 2 and the spur with the track for the mine car 3, by the numeral 4.

Figure 1:
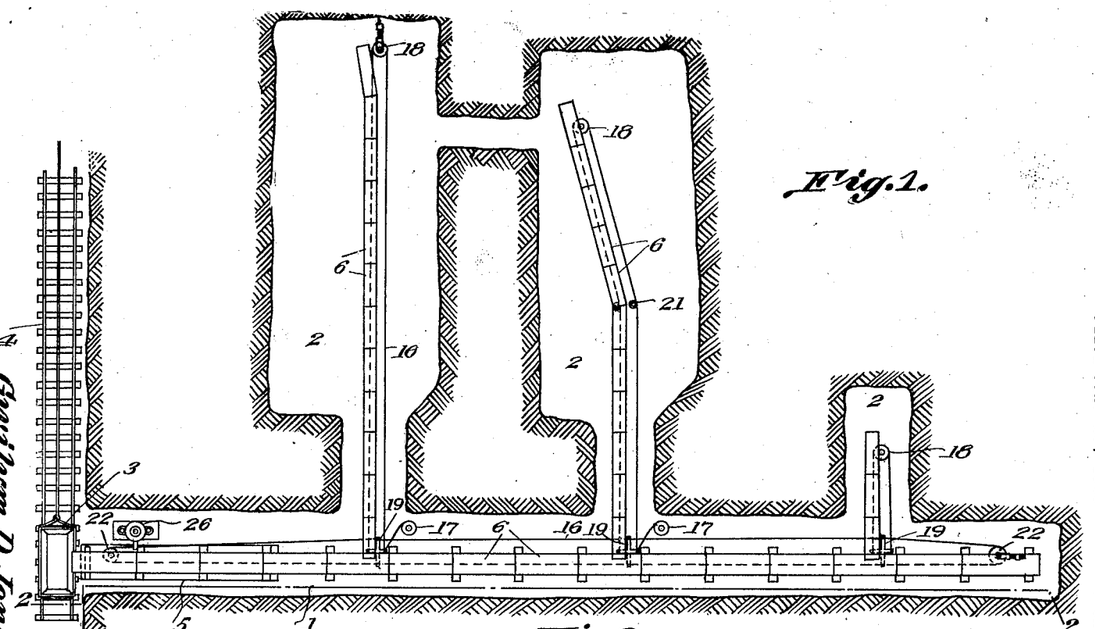
Figure 1 is a plan view of my improvement in applied position in a coal mine.
Figure 2:
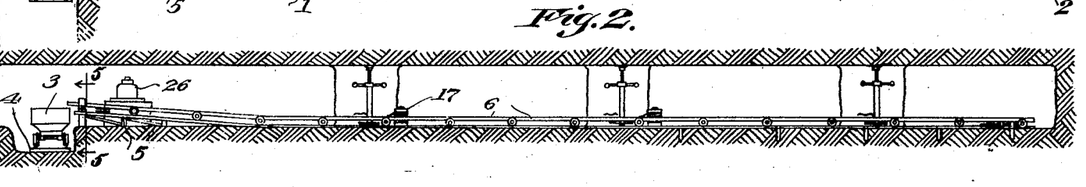
Figure 2 is a sectional view approximately on the line 2—2 of Figure 1.
Figure 3:
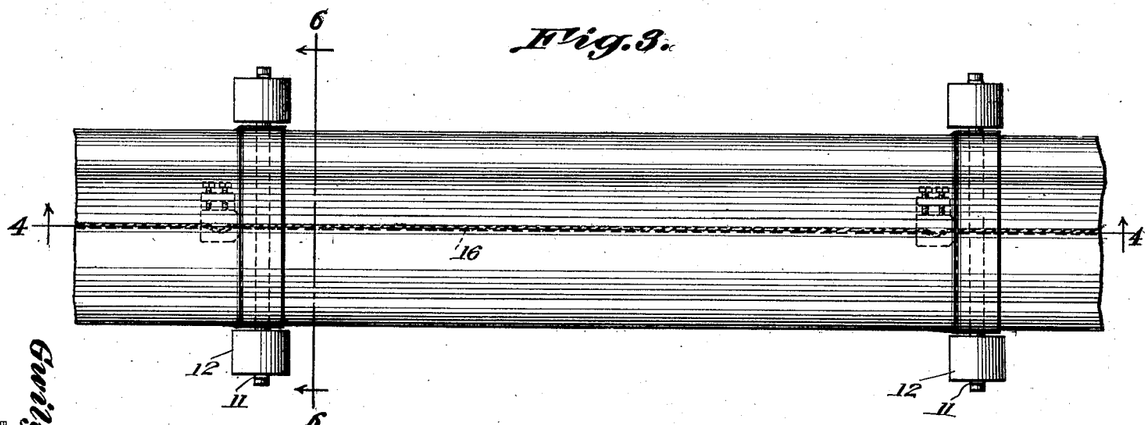
Figure 3 is a plan view to illustrate the connected or associated pans or flights of the conveyer.
Figure 4:
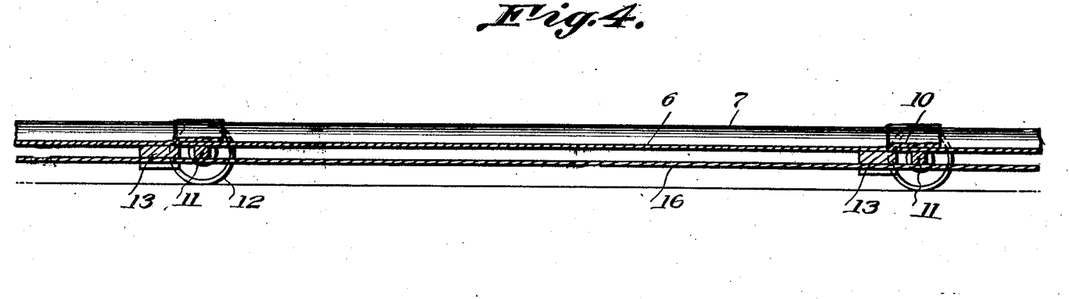
Figure 4 is a sectional view on the line 4—4 of Figure 3.
Figure 5:
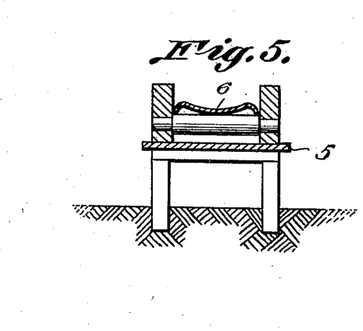
Figure 5 is a sectional view approximately on the line 5—5 of Figure 1.
Figures 6, 7:
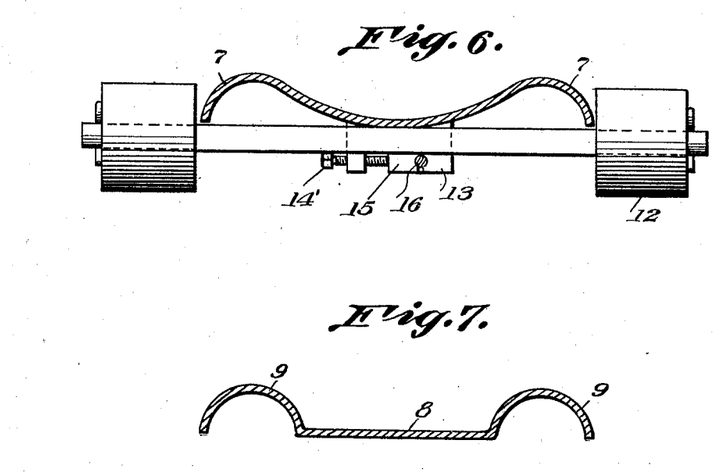
Figure 6 is a sectional view approximately on the line 6—6 of Figure 3.
Figure 7 is a transverse sectional view through one of the pans or flights.

As disclosed especially by Figures 1 and 2 of the drawings I employ a main or receiving conveyer which is arranged in the main passage 1 and auxiliary or branch conveyers which are arranged in the rooms 2 and which deliver onto the main conveyer. The main conveyer has its delivery end arranged over the mine car 3, and in order to elevate this end of the said main conveyer I secure on the floor of the main passage 1 an inclined frame 5 whose side walls receive the conveyer therebetween. All of the conveyers are made up of flights of comparatively thin metal and each flight is preferably of the same length. As disclosed by Figure 6 of the drawings, the flights 6 may be downwardly bulged longitudinally and the ends thereof are rounded downwardly, as at 7. If preferred, however, the bottom of the flights may be flat, as indicated by the numeral 8 in Figure 7 and the edges thereof curved or rounded, as at 9. Of course, I do not wish to be restricted to the precise construction of flights as disclosed in the said Figures 6 and 7 but I have found that by rounding or beading the edges of the flights the same are materially strengthened so that a metal of a comparatively small weight and thickness may be successfully employed.

Each flight or pan, adjacent to one of its ends, is depressed on its under face to form a lip 10 which is arranged in lapping relation over the end of the cooperating flight.

Preferably the under faces of each of the pan-like flights, at the non-lipped ends thereof have fixed thereto transversely arranged axles 11 which are preferably rectangular in cross section, but which have rounded ends on which are journaled wheels or rollers 12. Each of the flights, adjacent to its lipped end has centrally secured on the under face thereof a substantially U-shaped block 13. One of the depending flanges of each of the blocks is formed with a central inwardly projecting rounded extension or lug 13' and the inner face of the said projection is centrally formed with a centrally disposed longitudinally arranged depression 14. The second depending portion of each of the substantially U-shaped blocks 13 is straight throughout and provides what I will term a lip 13''. Screwed through suitable threaded openings in the lip 13'' there are bolt members 14'. These bolts preferably have their ends swivelly received in the outer faces of clamping blocks 15. Each clamping block has its active face centrally formed with a rounded depression or concavity, and the said active face of each of the clamping blocks 15 is formed with a longitudinally extending rounded depression 15' which is disposed opposite the continuous groove or depression 14 in the first mentioned depending portion or flange of the block 13. This depending portion of the block provides a jaw element and the clamping block 15 provides a cooperating jaw element and between these elements there is designed to be firmly clamped cables 16. The cables 16, it will be noted flexibly connect and associate the flights.

The cables for the receiving or branch conveyers are unwound from suitable drums or spools 17 and are from thence directed around sheave wheels 18 that are suitably secured in the rooms 2, the second lead of the cables being connected to the flights of the conveyers in a manner as above described. Both leads of the cables for the receiving conveyers are attached to the oppositely directed arms of what I will term bell crank levers 19. The means 20, which attaches the leads of the cables to the bell crank levers 19 are preferably in the nature of clamps substantially similar to those previously described and the movable jaw members thereof, when released from binding engagement against the bell crank levers and the cables, permit the said cables being lengthened or shortened when flights are to be added to the conveyers or flights detached therefrom. In this manner it will be noted that the receiving or auxiliary conveyers may be of different desired lengths to accord with the depth of the rooms in which the conveyers are arranged. The flights of the conveyers may be arranged angularly with respect to each other, by simply arranging the sheave wheels 18 at a desired angle in a room 2 and by canting or arranging one or more of the flights at an angle with respect to the remaining flights. This construction is best illustrated by the intermediate auxiliary or receiving conveyer in Figure 1 of the drawings. When so arranged both of the leads for the conveyer are trained around suitable grooved guides or sheaves 21.

The cable for the flights of the main conveyer is preferably continuous or endless and is trained around head sheave wheels 22, respectively, suitably journaled adjacent to the inner and outer ends of the passage 1. The leads of the cable for the main conveyer are connected to arms of bell crank levers 23 which are arranged angularly with respect to the arms of the bell crank levers 19 and which are disposed directly below the said bell crank levers 19, and which likewise have their hubs integrally formed with the hubs of the said bell crank levers 19. Thus it will be noted that the bell crank levers 19 and 23 are integrally connected at the center thereof.

The connected pairs of bell crank levers 19 and 23 are journaled on the tubular body portions 24 of screw jacks 25, the hubs of the said bell crank levers resting on the base of the body 24. The screw jacks are operated by the usual handles and in addition to providing journals for the bell crank levers, the said jacks support the roofs of the rooms and passages. In this connection it may be stated that the guide or sheave wheels for the cables of the auxiliary conveyers may be journaled upon similar jacks.

By reference to Figure 1 of the drawings it will be seen that the flights at the delivery ends of the receiving or auxiliary conveyer are disposed over the flights of the main conveyer and the conveyers are all simultaneously operated by a single motor 26 which is diagrammatically illustrated in Figures 1 and 2 of the drawings. The shaft of the motor imparts a rotary motion to a pinion 27. The pinion is in mesh with the toothed wheel 28. The pinion and toothed wheel are enclosed in a suitable casing 29, the shafts for the said wheels being, of course, suitably journaled in the casing. Fixed in the casing 29 there is one end of an angularly arranged angle bracket 30. This bracket is provided with a plurality of spaced apertures 31. Received through any one of these apertures there is a pivot element 32 for a rocker arm 33. The rocker arm is provided with an elongated slot 34 and fixed on the toothed wheel 28 there is a stub shaft having an outer removable headed portion 35, the said stub shaft passing through the slot 34 in the rocker arm 33. The outer or free end of the rocker arm passes through an elongated slot or opening 36 in one of the sides of the housing 29, and the outer end of the said arm is fixedly secured to one of the leads of the continuous operating cable for the main conveyer.

When the motor is in operation the pinion 27 will impart a rotary motion to the toothed wheel 28, and this wheel, through the medium of its stub shaft 35 playing in the slot 34 of the rocker arm 33, will impart a swinging motion to the said rocker arm. The stub shaft 35 is arranged close to the periphery of the toothed wheel 28, so that the rocker arm will be given a rapid swinging motion in one direction and a slow return swinging in an opposite direction. This alternate rapid and slow swinging of the rocker arm will impart a like movement to the arms of the bell crank lever 22 to which the cable of the main conveyer is attached and similar movements to the bell crank levers 19 for the cables of the auxiliary conveyer. The result is that the material on the auxiliary conveyers and the material delivered from the auxiliary conveyer onto the main conveyer will be caused to bodily move toward the delivery end of both of these conveyers when the said conveyers are rapidly moved in a delivery direction and as all of the conveyers are slowly returned to initial position the material is held from sliding or moving backwardly on such conveyers.

Figure 8:
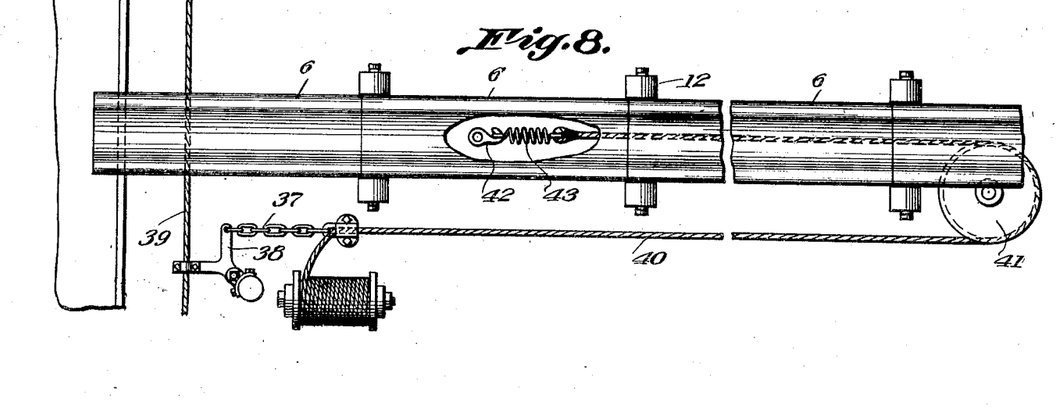
Figure 8 is a plan view illustrating the manner in which the operating cable may be resiliently connected to one of the flights.
Figure 9:
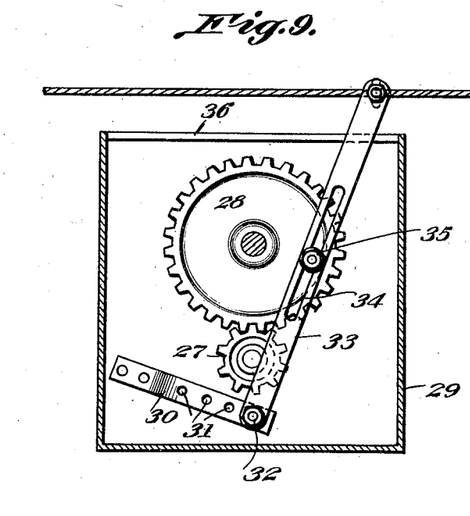
Figure 9 is a plan view of the operating mechanism for the conveyers, with the housing therefor in section.
Figure 10:
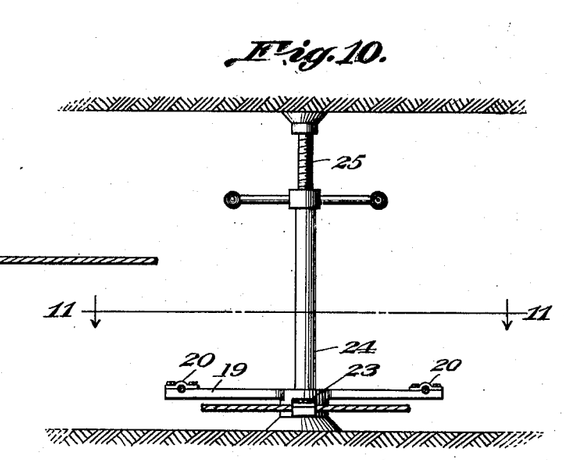
Figure 10 is a sectional view to illustrate the manner in which the jack between the floor and roof of a mine is employed as a bearing element for the crossed arms or bell cranks of the improvement.
Figure 11:
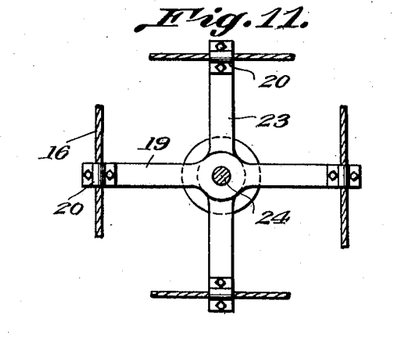
Figure 11 is a sectional view approximately on the line 11—11 of Figure 10.

In Figure 8 of the drawings I have illustrated a cable for one of the auxiliary conveyers wound around a suitable drum but having one of its leads connected by a chain 37, which in turn is connected to one arm of a bell crank lever 38, the second arm of the said lever being connected to the cable 39 for the main conveyer. The first mentioned cable is indicated for distinction by the numeral 40 and is trained around the sheave or like wheel 41 and likewise trained beneath the flights of the auxiliary conveyer and is not attached to said flights. The floor of the mine has pivotally secured thereon a hook member 42 which is engaged by one end of a helical spring 43, the second end of the spring being secured to the lead of the cable 40 directed beneath the flights of the auxiliary conveyer. In this instance, the spring 43 imparts the desired rapid and jerking motion to the auxiliary conveyer and moves the same in a delivery direction.

Figure 12:
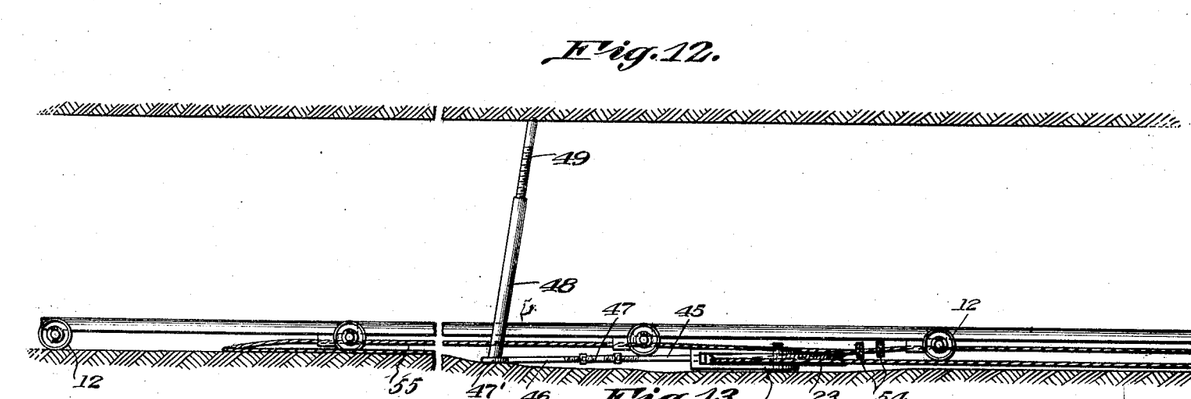
Figure 12 is a sectional view to illustrate the arrangement of the pans or flights beyond one of the head sheave wheels and pipe jack or brace.
Figure 13:
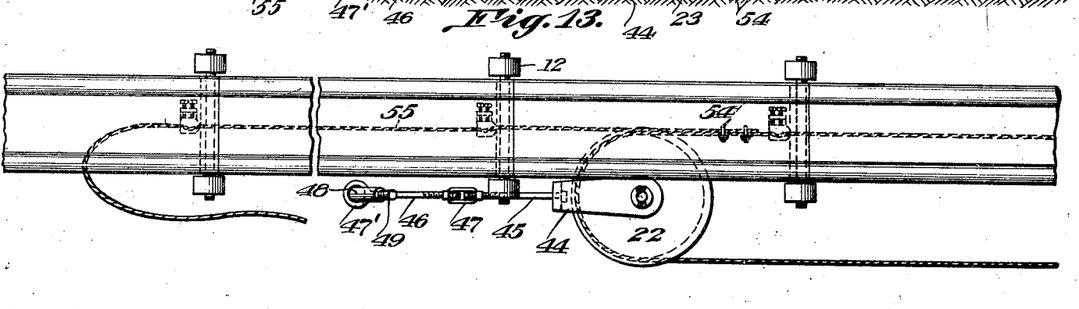
Figure 13 is a plan view thereof, the pipe jack or brace having its upper portion in section.
Figure 14:
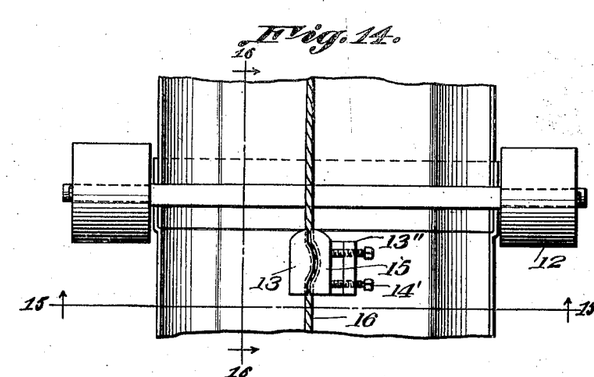
Figure 14 is an under face view of the confronting ends of two of the pans or flights to more clearly illustrate the manner in which the cable is secured thereon and whereby said cable connects the pans or flights.
Figure 15:
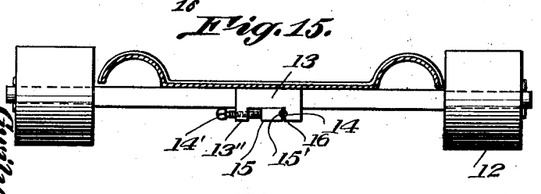
Figure 15 is a sectional view approximately on the line 15—15 of Figure 14 but showing the device in its normal upright position.
Figure 16:
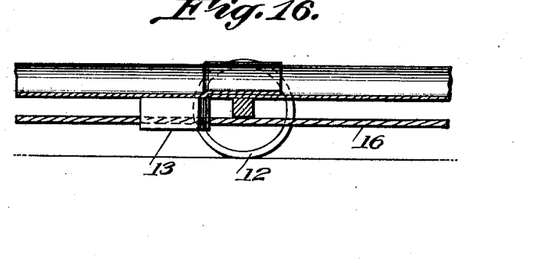
Figure 16 is a sectional view approximately on the line 16—16 of Figure 14, the parts being in upright position.

In Figures 12 and 13 I have illustrated the manner in which the head sheave wheels 22 are journaled and supported. Each of the wheels 22 has the ends of its shaft journaled in bearing openings in the yoke 44, and each yoke has connected thereto a threaded rod 45. This rod, together with the second rod 46 that has a different hand pitch from that of the rod 45 is engaged by a turn-buckle 47. Each of the rods 46 has an eye end 47' that receives therethrough the hollow member 48 of a pipe jack. The solid member 49 of the jack is threaded and is screwed in the threaded bore of member 48. The member 48 is forced into the ground or floor of the mine and the member 49 is forced against the ceiling of the mine, and in this manner the sheave wheels 22 are effectively but adjustably supported from the jacks.

Figure 17:
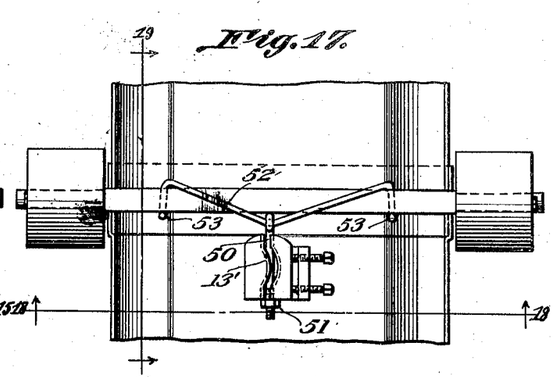
Figure 17 is an inverted plan view looking toward the confronting ends of two of the pans or flights and illustrating the manner in which these pans or flights are connected to permit of the same being rolled or otherwise moved in unison to a desired place in the mine.
Figure 18:
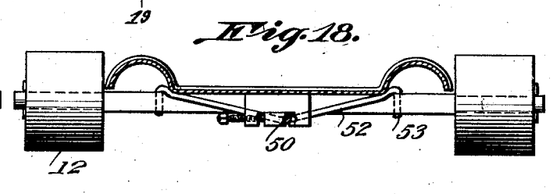
Figure 18 is a sectional view approximately on the line 18—18 of Figure 17, with the device in its normal or upright position.
Figure 19:
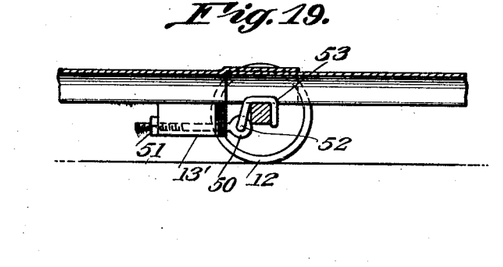
Figure 19 is a sectional view on the line 19—19 of Figure 17, with the device arranged as disclosed by Figure 18.
Figure 20:
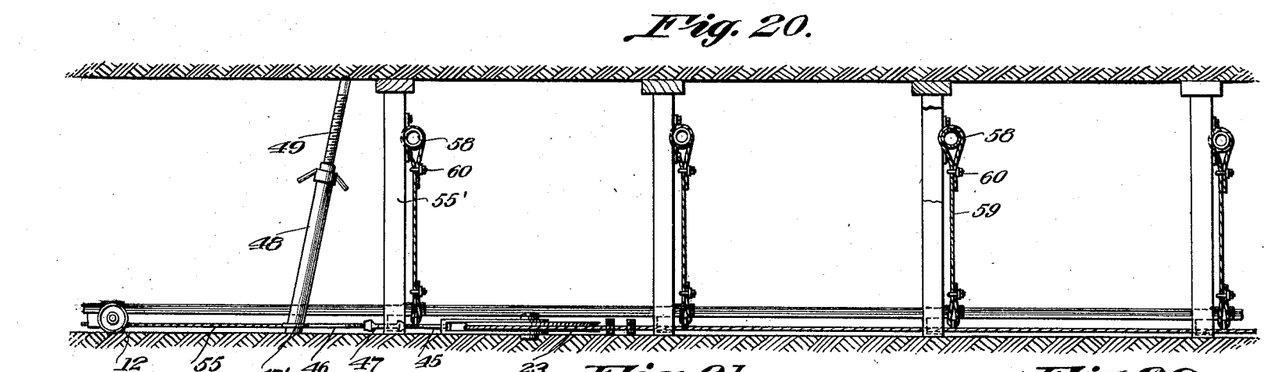
Figure 20 is a modification substantially similar to Fig. 12.

By mounting the wheels or rollers adjacent one end of each of the flights it will be apparent that the flights when canted from their opposite ends may be easily pushed or rolled and thereby conveniently conveyed to desired places in the mine. To connect a number of the flights and to move the same as a unit, prior to the connection of the operating cables therewith, I employ the means disclosed in Figures 17 to 19. In these figures it will be seen that an eye bolt 50 is passed through the grooves of the clamping elements on the flights, one end of the said eye bolt being engaged by a nut 51 and the eye end thereof having passed therethrough and received therein the central portion of a substantially V-shaped rod 52. The ends of the rod 52 are bent upon themselves to provide hooks 53 to engage both the top and sides of the axle of the flight to be connected to the flight to which the eye bolt is temporarily attached. By this arrangement it will be apparent that a large number of connected flights may be bodily rolled to desired positions, and thereafter the eye bolts and hook carrying rods 52 detached and the operating cables arranged between the clamping jaws of the flights in a manner as previously described.

It is desirable to arrange flights beyond the head sheaves 22, and also beyond the inner end flights for the delivery conveyers. In this connection it may be stated that the inner sheave for the delivery conveyers is preferably supported in a similar manner to the head sheaves 22. When flights are to be added I clamp, as at 54, upon the inner leads of the operating cables, that is the leads of the cables beneath the flights, one end of an auxiliary cable 55, and this cable is clamped and firmly secured to the added flights in a manner as previously described.

It will be apparent that the flexible connection between the flights of the conveyers allows the said conveyers to be successfully operated upon uneven mine floors.

The construction and advantages of my improvement will, it is thought, be understood and appreciated by those skilled in the art to which such invention relates when the foregoing description has been carefully read in connection with the accompanying drawings so that a further detailed description is not believed necessary.

Figures 21, 22, 23:
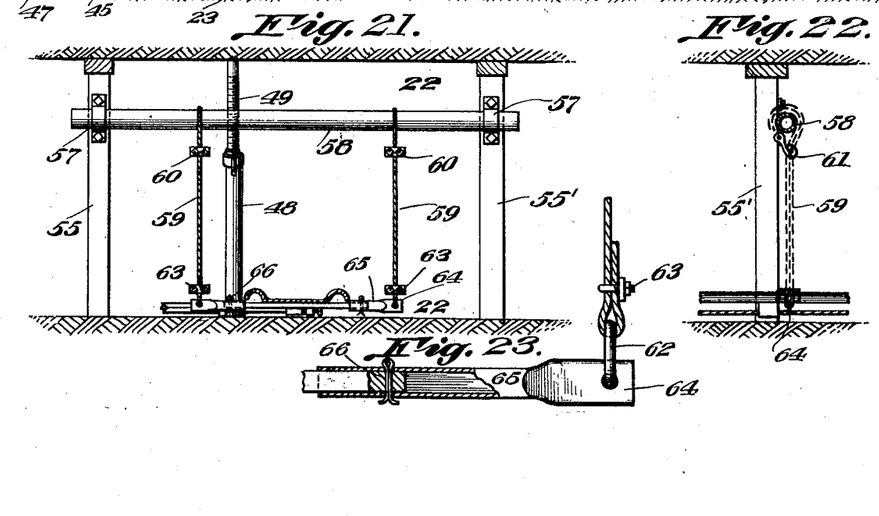
Figure 21 is a transverse sectional view therethrough.
Figure 22 is a section on the line 22—22 of Fig. 21.
Figure 23 is a detail view to illustrate the socket connection with the shafts of the flights.

In Figures 21 to 23 I have illustrated a means whereby the flights may be suspended for swinging movement in the rooms of a mine. In these figures I arrange between the floor and top of mine rooms posts 55 that are wedged against and secured to beams 56 on the roof of a mine room. These posts or standards are arranged in opposite pairs and have secured on one of their faces clips 57 and similar bearings for rods 58. Each rod 58 has connected thereto and depending therefrom a chain or like flexible element 59. When the flexible elements are in the nature of cords or cables, adjustable clamping means 60 are secured between the looped strands that are arranged around the rods 58 and when the flexible elements are in the nature of chains, the end of the chain that is looped around the rod 58 is provided with a hook 61 to engage with one of the links of the chain. In both instances it will be noted that the flexible elements are adjustably but swingably supported on the cross sectionally rounded bars or rods 58. The second or lower end of each of the flexible elements is looped and received through an eye 62 and the lower ends of these elements are connected by adjustable means 63. The eyes 62 pass through openings in the flattened ends 64 of socket members 65. The socket members receive therein the outer ends of the shafts for the flights. In this instance the outer ends of the axles have openings therethrough to aline with similar openings in the sockets 65, it being understood that the rollers are removed from the shafts, and passing through these alining openings there are sustaining elements, such as cotter pins 66. The flights may be connected by the rods 52, and the flights beyond the head sheave may be supported on the rollers as heretofore described. The operation is similar to that previously set forth, the only difference being that the flights are suspended for swinging movement by the flexible supporting elements therefor.

Having described the invention, I claim:

1. A conveyer mechanism comprising an elongated means for carrying and conveying material, said means comprising a series of flights, means for supporting said carrying means and movable over the surface of the ground, and flexible means extending along said conveyer and flights and connected at intervals to each of said flights for longitudinally moving said conveying means and said supporting means.

2. A conveyer mechanism comprising an elongated conveyer for carrying and conveying materials, said conveyer comprising a series of flights, means at the end portions of said flights for supporting the same and movable over the surface of the ground, and means including a flexible means extending along said conveyer and connected at intervals to each of said flights for longitudinally moving said flights and supporting means, whereby said material is progressively moved forwardly.

3. A conveyer mechanism comprising an elongated conveyer for carrying and conveying materials, said conveyer comprising a series of flights, said flights overlapping, means for supporting said overlapped ends of said flights and movable over the surface of the ground, flexible means attached to said flights, and means connected to said flexible means for longitudinally moving said flights violently in a forward direction and to return them comparatively slowly to their starting position.

4. A conveyer mechanism comprising an elongated conveyer for carrying and conveying materials, said conveyer comprising a series of flights, each flight having a lipped end portion adapted to receive an end of an adjacent flight, flexible means connecting said flights, means for supporting said flights and movable over the surface of the ground, and means including said flexible means for longitudinally moving said flights violently in a forward direction and to return them comparatively slowly to their starting position.

5. A conveyer mechanism comprising an elongated conveyer for carrying and conveying materials, said conveyer comprising a series of flights, each flight having a lipped end portion adapted to receive an end of an adjacent flight, a cable extending longitudinally of said conveyer and connected to each of said flights, means for supporting said flights and movable over the surface of the ground, and means connected to said cable for longitudinally moving said flights and said supporting means for progressively moving the material forwardly.

6. A conveyer mechanism comprising a series of elongated conveyer sections for carrying and conveying materials, axles spaced along said conveyer and transversely thereof, rollers journalled on said axles and adapted to move said conveyer over the surface of the ground, and flexible means connected to each of said sections for longitudinally moving said conveying means on said rollers.

7. A conveyer mechanism comprising an elongated conveyer for carrying and conveying materials, said conveyer comprising a series of flights, each flight having a lipped end portion adapted to receive an end of an adjacent flight, an axle transversely of each flight and supporting the other end of said flight, rollers journalled on each axle and adapted to move said flight over the surface of the ground, and means including flexible means connected to said flights for longitudinally moving said flights violently in a forward direction and to return them comparatively slowly to their starting position.

8. A conveyer mechanism comprising an elongated conveyer for carrying and conveying material, said conveyer comprising a series of flights, each flight having a lipped end portion adapted to receive an end of an adjacent flight, flexible means connected to each of said flights, an axial transversely of each of said flights and connected thereto, rollers journalled on said axles and adapted to move said flights over the surface of the ground, and means connected to said flexible means for longitudinally moving said flights violently in a forward direction and to return them comparatively slowly to their starting position.

9. A conveyer mechanism comprising an elongated conveyer for carrying materials, said conveyer comprising a series of flights, each of said flights having a lipped end portion adapted to receive an end of an adjacent flight, a cable extending longitudinally of said conveyer and connected to each of said flights, an axle transversely of each of said flights and supporting the other end of said flight, rollers journalled on said axles and adapted to move said flights over the surface of the ground, and means connected to said flexible means for longitudnally moving said flights violently in a forward direction and to return them comparatively slowly to their starting position.

10. A conveyer mechanism comprising an elongated conveyer for carrying materials, said conveyer comprising a series of flights, each of said flights having a lipped end portion adapted to receive an end of an adjacent flight, flexible means connected to the lipped end portion of each of said flights, an axle transversely of each of said flights and supporting the other end of said flight, rollers journalled on said axles and adapted to move said flights over the surface of the ground, and means connected to said flexible means for longitudinally moving said flights violently in a forward direction and to return them comparatively slowly to their starting position.

11. A conveyer mechanism comprising an elongated conveyer for carrying and conveying materials, said conveyer comprising a series of flights, each of said flights having a lipped end portion adapted to receive an end of an adjacent flight, an axle transversely of each of said flights and supporting the other end of said flight, rollers journalled on said axles and adapted to move said flights over the surface of the ground, and means connected to the lipped end of each of said flights and adapted to engage the axle of each adjacent flight for holding the flights in association when the conveyer is bodily moved longitudinally.

12. A conveyer mechanism comprising an elongated means for carrying and conveying material, similar elongated means adapted to be positioned laterally to said first means, said means comprising a series of flights, means for supporting said carrying means and movable over the surface of the ground, and means including flexible means connected to each of said flights for simultaneously moving said carrying means for progressively moving the material forwardly.

13. A conveyer mechanism comprising an elongated receiving conveyer and delivery conveyers extending laterally to said receiving conveyer, said conveyers each comprising a series of flights, means for supporting said flights and movable over the surface of the ground, flexible means connected to each of said flights, and means including said flexible means for simultaneously moving the flights of said receiving and delivery conveyers violently in a forward direction and to return them comparatively slowly to their starting position for progressively moving the material toward the discharge end of the receiving conveyer.

14. A conveyer mechanism comprising an elongated receiving conveyer and delivery conveyers extending laterally to said receiving conveyer, each of said conveyers comprising a series of flights, roller means for supporting said flights and movable over the surface of the ground, cables connected to the flights of said conveyers, means connected to the cable of said receiving conveyer for moving the flights of said conveyer violently in a forward direction and to return them comparatively slowly to their starting position, and bell cranks at the junction of said receiving conveyer and delivery conveyers, said cranks having arms connected to the driving cables of said receiving conveyers and arms connected to the cable connected to said delivery conveyers, said cranks simultaneously transferring movements in the receiving conveyer to the delivery conveyers.

15. In a conveyer mechanism, a conveyer for carrying material, a driving mechanism comprising a driven wheel, a stub shaft mounted adjacent to the periphery of said wheel, a slotted rocker arm engaging the stub shaft, said arm connected to a cable connected to said conveyer, said arm adapted to rock as said wheel is rotated to impart to the cable a violent movement in a forward direction and a comparatively slow movement in the reverse direction.

16. A conveyer mechanism comprising an elongated conveyer for carrying and conveying materials, said conveyer comprising a series of flights, a cable extending longitudinally of said conveyer and connected at intervals to said flights, and means including said cable for longitudinally moving said flights violently in a forward direction and return them comparatively slowly to their starting position.

In testimony whereof I affix my signature.

GWILYM D. JONES.